United States Patent
Hillan

(10) Patent No.: US 8,126,447 B2
(45) Date of Patent: Feb. 28, 2012

(54) COMBINED BLUETOOTH/ALTERNATE RADIO ENVIRONMENT WITH CRITERION FOR REPORTING A CONDITION OF THE ALTERNATE RADIO DEFINED IN A PHYSICAL ABSTRACTION LAYER ASSOCIATED WITH THE ALTERNATE RADIO

(75) Inventor: John Hillan, Alton (GB)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 12/348,744

(22) Filed: Jan. 5, 2009

(65) Prior Publication Data

US 2010/0173621 A1    Jul. 8, 2010

(51) Int. Cl.
    *H04M 3/00*    (2006.01)
(52) U.S. Cl. ......................... 455/418; 455/41.1; 455/41.2
(58) Field of Classification Search .................. 455/403, 455/414.1, 418–421, 422.1, 426.2, 428, 435.2, 455/41.1, 41.2
    See application file for complete search history.

(56) References Cited

U.S. PATENT DOCUMENTS

| | | | |
|---|---|---|---|
| 6,961,942 B1 | 11/2005 | Adermann et al. | |
| 7,835,328 B2* | 11/2010 | Stephens et al. | 370/338 |
| 2004/0215769 A1* | 10/2004 | Yoshida et al. | 709/224 |
| 2005/0068965 A1 | 3/2005 | Lin et al. | |
| 2006/0193295 A1 | 8/2006 | White et al. | |
| 2007/0160002 A1 | 7/2007 | Wolman et al. | |
| 2009/0280775 A1* | 11/2009 | Moeglein et al. | 455/410 |
| 2010/0144288 A1* | 6/2010 | Walley et al. | 455/77 |
| 2010/0330976 A1* | 12/2010 | Berna Fornies et al. | 455/419 |

FOREIGN PATENT DOCUMENTS

WO    WO2007078663 A2    7/2007

OTHER PUBLICATIONS

International Search Report and Written Opinion—PCT/US2010/020083—ISAEPO—Mar. 24, 2010.

* cited by examiner

*Primary Examiner* — Cong Tran
(74) *Attorney, Agent, or Firm* — Stanton Braden

(57) ABSTRACT

In a combined Bluetooth/alternate radio environment, an intermediate level software layer interprets operational conditions of a Bluetooth radio for an upper level, supervisory software layer. The intermediate level software layer also interfaces between the upper level software layer and a lower level software layer that interfaces to the alternate radio. The lower level software layer defines therein a criterion for reporting a condition of the alternate radio to the upper level software layer.

20 Claims, 2 Drawing Sheets

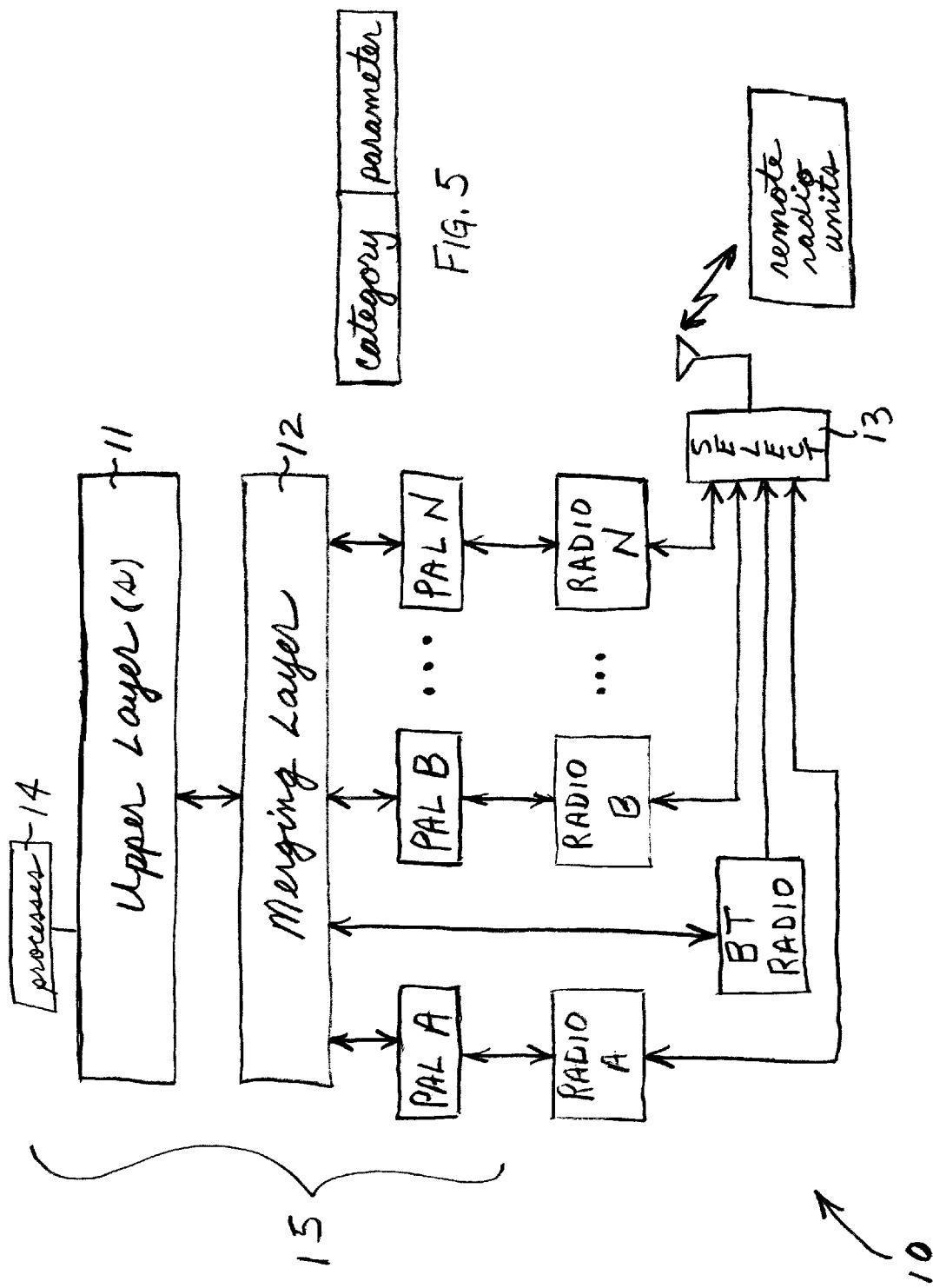

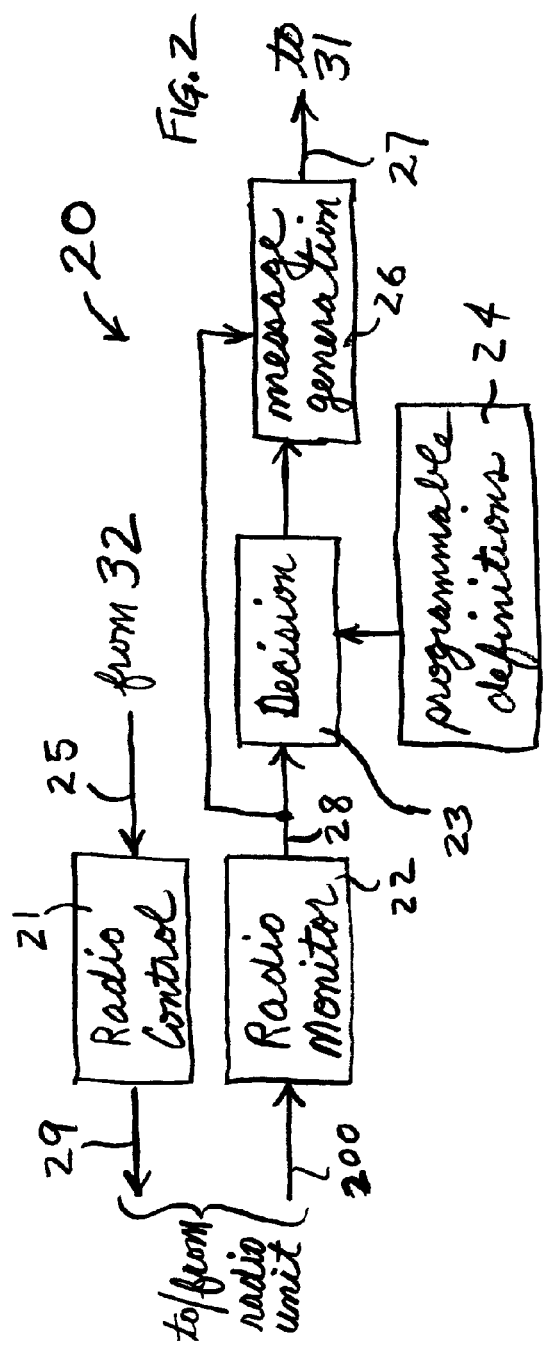
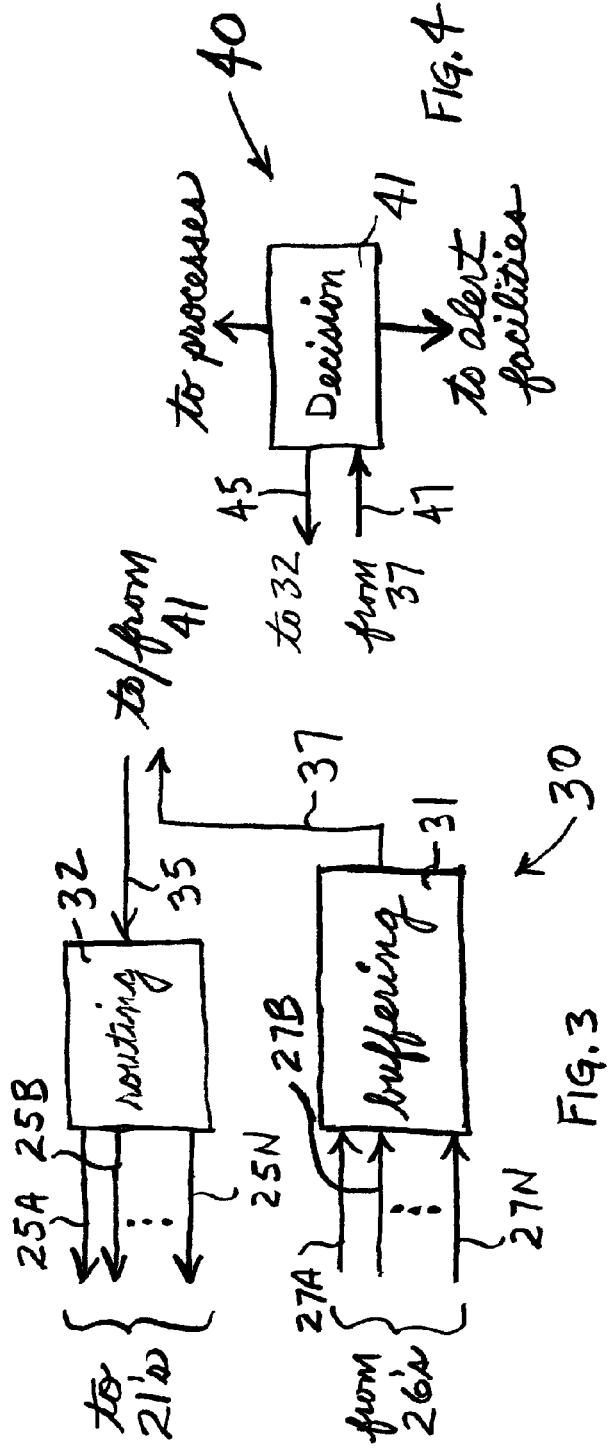

COMBINED BLUETOOTH/ALTERNATE RADIO ENVIRONMENT WITH CRITERION FOR REPORTING A CONDITION OF THE ALTERNATE RADIO DEFINED IN A PHYSICAL ABSTRACTION LAYER ASSOCIATED WITH THE ALTERNATE RADIO

BACKGROUND

1. Field

The present work relates generally to radio communications and, more particularly, to radio communications that use a plurality of different radio links.

2. Background

Industry designers have recently reworked a portion of the stack in legacy Bluetooth devices to support different, high speed radios such as WiMedia (Ultra Wide Band) and WiFi, under substantially similar upper layer software. The product of this effort, called the AMP (Alternate MAC/PHY) architecture, is illustrated diagrammatically in FIG. 1.

As shown in FIG. 1, the AMP architecture provides for the use of multiple radio units, Radio1-RadioN, in addition to a Bluetooth (BT) radio unit. The additional radio units Radio1-RadioN support wireless communication on respective radio links other than the BT link. A selector arrangement 13 selects among the radio units and corresponding radio links for communication with remote external radio units. The architecture further includes a data processing portion, designated generally at 15, that implements operational processes 14 associated with the functionality of the device. Examples of the operational processes at 14 include data transfers (e.g., to flash cards, printers, user interfaces etc.) and control of user interfaces.

Referring again to the legacy BT device, an L2CAP software layer in the data processing portion interfaces between the BT radio unit and an upper level supervisory software layer that provides control for the BT radio unit and the operational processes of the legacy BT device. This interfacing includes interpreting operating conditions of the BT radio for the upper level layer. In the AMP architecture of FIG. 1, an intermediate level software layer 12 called a merging layer represents an expansion of the legacy L2CAP layer to include, in addition to the legacy function of interfacing the BT radio unit to the upper level layer 11, the further capability of interfacing between the upper level layer 11 and lower level software layers called physical abstraction layers, designated as PAL A-PAL N in FIG. 1. The upper layer 11 provides control for the radio units and the operational processes 14 in the FIG. 1 AMP architecture. The layers PAL A-PAL N abstract operating signals associated with the respectively corresponding radio units, Radio1-Radio N, so that the information abstracted from the signals may be conveniently processed by the upper layer 11. These PALs also translate information produced by the upper layer 11 into corresponding signaling suitable for the associated radio units.

It is desirable to provide a capability of interpreting information abstracted by a given one of the PALs in order to produce, as needed, a corresponding radio link condition report for use by the upper layer. It is further desirable to provide this capability in a layer below the upper layer, in order to avoid complexities in the upper layer design.

SUMMARY

In a combined Bluetooth/alternate radio environment, an intermediate level software layer interprets operational conditions of a Bluetooth radio for an upper level, supervisory software layer. The intermediate level software layer also interfaces between the upper level software layer and a lower level software layer that interfaces to the alternate radio. The lower level software layer defines therein a criterion for reporting a condition of the alternate radio to the upper level software layer.

BRIEF DESCRIPTION OF THE DRAWINGS

Various aspects of a wireless communications system are illustrated by way of example, and not by way of limitation, in the accompanying drawings, wherein:

FIG. 1 diagrammatically illustrates a prior art wireless communication apparatus;

FIG. 2 diagrammatically illustrates a lower level physical abstraction layer of a wireless communication apparatus according to exemplary embodiments of the present work;

FIG. 3 diagrammatically illustrates an intermediate level merging layer according to exemplary embodiments of the present work;

FIG. 4 diagrammatically illustrates an upper level supervisory layer according to exemplary embodiments of the present work; and FIG. 5 diagrammatically illustrates an augmented event message according to exemplary embodiments of the present work.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

The word "exemplary" is used herein to mean "serving as an example, instance, or illustration." Any embodiment described herein as "exemplary" is not necessarily to be construed as preferred or advantageous over other embodiments.

The initial focus of the aforementioned AMP architecture development was the addition of a WiMedia radio unit to the legacy Bluetooth device. The architecture is capable of recognizing an event, namely, that there is some possibility that the WiMedia radio link has been (or is about to be) lost. In particular, the merging layer 12 interprets operating information abstracted from signals in the WiMedia radio unit and, if the event is recognized, the merging layer 12 produces an event message indicative of the event. More specifically, if the abstracted operating information indicates that four WiMedia Superframes have passed without seeing in the WiMedia beacons certain information about the remote device, the merging layer 12 sends the event message to the upper layer 11. Because this procedure is tied to one (the WiMedia) radio technology, it has no relevance to other ones of the alternate radios (for example, WiFi) provided for in FIG. 1. Moreover, use of the merging layer 12 to interpret operating condition information abstracted from multiple radio units is a relatively complicated software design problem. Also, the AMP architecture does not provide for a conformant way to permit the event message to be sent under different operating conditions (e.g., triggering on the passage of six Superframes instead of four). Furthermore, even within the context of WiMedia, there is no conformant way for the event message to provide additional information, such as an indication of the severity of the link loss event.

Exemplary embodiments of the present work remove, from the intermediate level merging layer down to the lower level PAL, the definition of the specific radio unit operating conditions under which the event message is sent. Some embodiments augment the event message by adding a parameter field which may be used by the designer of an individual PAL to provide additional information about the situation that caused the event message to be issued. An example of such an augmented event message according to the present work is shown in FIG. 5. The message includes a category field that contains qualitative information to designate the nature of the event message (e.g., a link quality or link loss indication), and a parameter field to provide the additional (e.g., quantitative) information about the situation that caused issuance of the event message.

In some radio units the occurrence of certain regularly scheduled link events (e.g., receipt of the aforementioned beacon information in WiMedia) is an indication that the link is still in good condition. In some embodiments, the PAL monitors how many such regularly scheduled events have failed to be observed during a given period. If this number exceeds a certain threshold, the PAL issues an event message whose category field indicates "potential link loss due to missing link events", and whose parameter field contains a number that indicates how many of the regularly scheduled link events have not been observed in the given period.

Most radio units measure received signal strength and produce a corresponding indication thereof, often known as RSSI. In some embodiments, the value of RSSI is monitored by the PAL and, if it drops below a certain threshold, this triggers the sending of a corresponding RSSI event message whose category field indicates "RSSI below threshold", and whose parameter field contains the measured value of RSSI. Various embodiments use various receiver-related parameters. For example, the PAL may define a trigger threshold for sending other event messages that are analogous to the aforementioned RSSI event message, but are associated with bit error rate (BER) or packet error rate (PER) instead of RSSI.

Some radio technologies have the ability to determine the range to the remote device. Some embodiments use this as an indication of a potential problem. For example, if the range exceeds a certain threshold, it may be known that link quality will begin to degrade significantly, so an event message is issued with category field "range over threshold", and with its parameter field containing the range value.

Some radio technologies spread transmissions across the frequency spectrum, and rely on a number of distinct channels being available in order to avoid higher power interferers. Such radios are normally able to monitor the number of channels that are blocked at any given time. In some embodiments, if this number exceeds a threshold, the PAL generates an event message whose category field indicates "number of blocked channels over threshold", and whose parameter field contains the number of blocked channels. The event message may alternatively be cast in terms of the number of unblocked channels falling below a threshold.

In some embodiments wherein the parameter field of the event message contains a numerical value, the PAL translates the numerical value into a code on a desired scale, for example, a 1-to-10 scale with 1 corresponding to the least severe condition, and 10 indicating the most severe condition. In some embodiments, all of the PALs apply this same severity scale coding in common to the various parameters that they report in various event messages.

In some embodiments, the PAL combines various available indicators to produce the content of an event message. For example, two or more of RSSI, BER, PER, range, number of blocked channels, or other indicators may be combined. Severity scale coding is used in some embodiments, to facilitate the combined use of various indicator values that may otherwise be difficult to combine usefully.

Advantageously, because the format of the event messages from all radio units is common, the upper layer software may be designed to analyze the event messages independently of the radio units to which they correspond. All interpretation of radio link condition signals is performed by the PALs, so the radio units themselves are transparent relative to the upper layer.

In some embodiments, an upper layer judges the actual condition of a given link by, for example, tracking the content of the parameter field as a moving average. If the link quality is trending down, various embodiments respond in various ways. In some embodiments, the upper layer attempts to cause the radio unit itself to take remedial action by, for example, sending to the radio unit a radio unit control instruction that directs the radio unit to request an increase in transmit power level at the remote device. In some embodiments, the upper layer directs the radio unit to select a different modulation scheme. Although this action may cause a reduction in the overall data rate, it may nevertheless be beneficial (at least on a temporary basis) in a deteriorating link scenario.

In some embodiments, the upper layer attempts to alert a user of the device regarding the potential problem, for example, by putting a suitable message on a display, by issuing an audible alert, or by causing the device to vibrate. In some embodiments, if the upper layer determines that link loss is imminent, it takes steps to minimize the severity of the consequences of the link loss. For example, the upper layer can cause muting of audio links, or graceful closing of files which are currently open for transfer.

Some embodiments use the content of the event message parameter field to tune the nature of the action taken according to the severity of the event. Some embodiments respond to an indication of a relatively minor problem such as slightly low RSSI by, for example, scheduling a follow-up check of RSSI values periodically (e.g., once per second) by the upper layer for a designated period of time. A relatively more severe problem indication, for example, the remote device being nearly out of range, may cause the upper layer to notify the user. The upper layer may respond to an extremely urgent problem by commencing graceful termination of active data transfers in anticipation of an imminent loss of connection. The upper layer has access to information that aids in making the determination of relative severity, so the upper layer is not likely to terminate links unnecessarily, thus avoiding unnecessary negative user experiences.

A further benefit of the event message parameter field is that it permits the upper layer software to learn of improvements in the radio link (not just imminent loss), and take appropriate responsive action. For example, in various embodiments, an upward trend in a moving average of a parameter value may result in the upper layer (1) directing a reduction in radio unit transmit power (or directing the radio unit to request a reduction in the transmit power of the remote device), (2) cancelling an alert to the user, or (3) aborting a link tear-down.

Some embodiments use event messages for radio resource management, where it is desirable to be able to determine the best radio unit for use in any given situation, based upon variables such as cost, power consumption, duration, and others. Link quality is a useful factor in determining which radio unit to select, because it gives a good indication of the likely data transfer rate. The event messages described herein allow various link-related parameters to be passed to an upper, supervisory layer in a format that simplifies the task of characterizing and comparing (among the different radio units) values such as RSSI, BER, transmit power level, and many others. The upper layer is able to evaluate the radio links relative to one another while the corresponding radio units remain transparent to the upper layer.

Some embodiments use event messages to pass information not just about overall link quality, but other radio parameters associated with the various radio units as well. Any such radio parameters may be used to determine if a switch to an alternate radio unit would be beneficial.

FIG. 2 diagrammatically illustrates pertinent portions of a lower level PAL 20 according to exemplary embodiments of the present work. In some embodiments, corresponding instances of PAL 20 respectively replace PAL A-PAL N of FIG. 1, and respectively include the existing capabilities of PAL A-PAL N to abstract information from signals respectively associated with Radio1-Radio N. In the PAL 20, a radio monitor portion 22 monitors signals 200 indicative of operating conditions in the corresponding radio unit, and abstracts from those signals corresponding operating condition information 28. A programmable definition portion 24 specifies available event message categories, and radio unit operating conditions that are defined to correspond, respectively, to those categories. A decision portion 23 compares the operating condition information 28 to the definitions at 24. If the decision portion 23 identifies, among the definitions at 24, a radio unit operating condition that corresponds to a condition indicated by operating condition information 28, then the decision portion 23 directs a message generation portion 26 to produce an event message for the category associated with the identified operating condition.

The message generation portion 26 extracts from the operating condition information 28 a parameter that is associated with the category that the decision portion 23 has identified. This parameter is then appended to the identified category (see also FIG. 5) to produce the required event message at 27. In some embodiments, the message generation portion 26 applies severity scale coding (such as described above) to the extracted parameter, and uses the severity scale coded result as the parameter field of the event message.

As an example, if the definition portion 24 includes the aforementioned category "RSSI below threshold", the decision portion 23 determines from the operating condition information 28 whether the RSSI is below the threshold. If so, the decision portion 23 directs the message generation portion 26 to produce an event message having category field "RSSI below threshold". The message generation portion 26 extracts the RSSI value from the operating condition information 28, and appends that RSSI value (or a corresponding severity scale coded value) to the "RSSI below threshold" category field, thereby producing the required event message, which is then to a merging layer (described in more detail hereinafter).

The PAL 20 of FIG. 2 further includes a radio control portion 21 that receives radio unit control instructions 25 that have been originated in an upper layer (described in more detail hereinafter) and passed to the PAL 20 via the aforementioned merging layer. Some examples of radio unit control instructions from the upper layer are described above. The radio control portion 21 translates the information in each instruction received at 25, in order to provide the corresponding radio unit with corresponding translated signaling 29 that is suitable for that radio unit.

FIG. 3 diagrammatically illustrates pertinent portions of an intermediate level merging layer 30 according to exemplary embodiments of the present work. In some embodiments, the merging layer 30 replaces the merging layer 12 of FIG. 1, and includes the existing capability of the merging layer 12 to interface with the BT radio unit of FIG. 1. As shown in FIG. 3, the merging layer 30 receives event messages 27A-27N respectively from the PALs 20. These event messages are buffered at 31, and forwarded at 37 to the upper layer. The merging layer 30 also receives at 35 radio unit control instructions from the upper layer, and routes these instructions (at 32) to the appropriate ones of the PALs 20. The radio unit control instructions are provided at 25A-25N to the respective PALs 20.

FIG. 4 diagrammatically illustrates pertinent portions of an upper level supervisory layer 40 according to exemplary embodiments of the present work. In some embodiments, the upper layer 40 replaces the upper layer 11 of FIG. 1, and includes the existing capability of upper layer 11 to interface with the BT radio unit via the merging layer 12. At 47, the upper layer 40 receives event messages forwarded from the PALs 20 via the merging layer 30. A decision portion 41 interprets the received event messages and takes action as appropriate. As discussed above, in some embodiments, the decision portion 41 may perform one or more of the following: (1) instruct one or more available user alert facilities to issue a user alert; (2) adjust one or more operational processes of the device (e.g., muting audio links, closing open files gracefully, etc.; and (3) issue a radio unit control instruction 45 to be routed to the associated radio unit via the merging layer 30.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A wireless communication apparatus that combines Bluetooth/alternate radio links, comprising:
    a first radio unit for communicating with an external apparatus on a Bluetooth radio link;
    a second radio unit for communicating with an external apparatus on a second radio link other than the Bluetooth radio link; and
    a data processing portion that implements upper, intermediate and lower level software layers, said intermediate level software layer providing interfacing between said first radio unit and said upper level software layer to interpret operational conditions of a Bluetooth radio for an upper level, supervisory software layer, said lower level software layer providing interfacing between said second radio unit and said intermediate level software layer, and said intermediate level software layer providing interfacing between said upper and lower level software layers;
    wherein said upper and intermediate level software layers are cooperable to permit said apparatus to respond to a first event associated with operation of said first radio unit, wherein said upper, intermediate and lower level software layers are cooperable to permit said apparatus to respond to a second event associated with operation of said second radio unit, wherein said intermediate level software layer notifies said upper level software layer of said first and second events, wherein said lower level software layer provides to said intermediate level software layer an event indicator that indicates occurrence of said second event, and wherein said lower level software layer provides said event indicator based on information received from said second radio unit and indicative of an operating condition associated with said second radio unit, and further based on information contained in said lower level software layer and defining a correspondence between said event indicator and said operating condition.

2. The apparatus of claim 1, wherein said defining information is programmable information.

3. The apparatus of claim 1, wherein said lower level software layer further provides to said intermediate level software layer information related to said operating condition.

4. The apparatus of claim 3, wherein said related information includes a coded version of a numerical value, and wherein the numerical value quantifies said operating condition.

5. The apparatus of claim 1, wherein said lower level software layer further provides to said intermediate level software layer information indicative of a severity of said operating condition.

6. The apparatus of claim 1, including a third radio unit for communicating with an external apparatus on a third radio link other than the Bluetooth radio link and the second radio link, said data processing portion implementing a further lower level software layer providing interfacing between said third radio unit and said intermediate level software layer, said intermediate level software layer providing interfacing between said upper level software layer and said further lower level software layer, wherein said upper, intermediate and further lower level software layers are cooperable to permit said apparatus to respond to a third event associated with operation of said third radio unit, wherein said intermediate level software layer notifies said upper level software layer of said third event, wherein said further lower level software layer provides to said intermediate level software layer a further event indicator that indicates occurrence of said third event, and wherein said further lower level software layer provides said further event indicator based on information received from said third radio unit and indicative of an operating condition associated with said third radio unit, and further based on information contained in said further lower level software layer and defining a correspondence between said further event indicator and said operating condition associated with said third radio unit.

7. The apparatus of claim 6, wherein said intermediate level software layer provides said event indicator and said further event indicator to said upper level software layer, and wherein said upper level software layer uses said event indicator and said further event indicator to evaluate said second and third radio units relative to one another while said second and third radio units remain transparent to said upper level software layer.

8. The apparatus of claim 1, wherein said operating condition information includes information indicative of one of RSSI, BER, PER, a range to an external apparatus, and a number of unavailable channels.

9. A wireless communication apparatus that combines Bluetooth/alternate radio links, comprising:
    first means for communicating with an external apparatus on a Bluetooth radio link;
    second means for communicating with an external apparatus on a second radio link other than the Bluetooth radio link; and
    third means for implementing upper, intermediate and lower level software layers, said intermediate level software layer providing interfacing between said first means and said upper level software layer to interpret operation conditions of a Bluetooth radio for an upper level, supervisory software layer, said lower level software layer providing interfacing between said second means and said intermediate level software layer, and said intermediate level software layer providing interfacing between said upper and lower level software layers;

wherein said upper and intermediate level software layers are cooperable to permit said apparatus to respond to a first event associated with said communication on said Bluetooth radio link, wherein said upper, intermediate and lower level software layers are cooperable to permit said apparatus to respond to a second event associated with said communication on said second radio link, wherein said intermediate level software layer notifies said upper level software layer of said first and second events, wherein said lower level software layer provides to said intermediate level software layer an event indicator that indicates occurrence of said second event, and wherein said lower level software layer provides said event indicator based on information produced in conjunction with said communication on said second radio link and indicative of an operating condition associated with said communication on said second radio link, and further based on information contained in said lower level software layer and defining a correspondence between said event indicator and said operating condition.

10. The apparatus of claim 9, wherein said defining information is programmable information.

11. The apparatus of claim 9, wherein said lower level software layer further provides to said intermediate level software layer information related to said operating condition.

12. The apparatus of claim 11, wherein said related information includes a coded version of a numerical value, and wherein the numerical value quantifies said operating condition.

13. The apparatus of claim 9, wherein said lower level software layer further provides to said intermediate level software layer information indicative of a severity of said operating condition.

14. A wireless communication method that combines Bluetooth/alternate radio links, comprising:

communicating with an external apparatus on a Bluetooth radio link;

communicating with an external apparatus on a second radio link other than the Bluetooth radio link; and implementing upper, intermediate and lower level software layers, said intermediate level software layer providing interfacing between said upper level software layer and a first radio unit associated with said Bluetooth radio link, said lower level software layer providing interfacing between said intermediate level software layer and a second radio unit associated with said second radio link, and said intermediate level software layer providing interfacing between said upper and lower level software layers;

wherein said upper and intermediate level software layers are cooperable to permit a response to a first event associated with said first-mentioned communicating, wherein said upper, intermediate and lower level software layers are cooperable to permit a response to a second event associated with said second-mentioned communicating, wherein said intermediate level software layer notifies said upper level software layer of said first and second events, wherein said lower level software layer provides to said intermediate level software layer an event indicator that indicates occurrence of said second event, and wherein said lower level software layer provides said event indicator based on information produced in conjunction with said second-mentioned communicating and indicative of an operating condition during said second-mentioned communicating, and further based on information contained in said lower level software layer and defining a correspondence between said event indicator and said operating condition.

15. The method of claim 14, wherein said defining information is programmable information.

16. The method of claim 14, wherein said lower level software layer further provides to said intermediate level software layer information related to said operating condition.

17. The method of claim 16, wherein said related information includes a coded version of a numerical value, and wherein the numerical value quantifies said operating condition.

18. The method of claim 14, wherein said lower level software layer further provides to said intermediate level software layer information indicative of a severity of said operating condition.

19. A computer program product for supporting wireless communication, comprising:

a computer-readable medium comprising:

code for causing at least one data processor to communicate with an external apparatus via a communication path including a Bluetooth radio link;

code for causing the at least one data processor to communicate with an external apparatus via a communication path including a second radio link other than the Bluetooth radio link; and code for causing the at least one data processor to implement upper, intermediate and lower level software layers, said intermediate level software layer providing interfacing between said upper level software layer and a first radio unit associated with said Bluetooth radio link, said lower level software layer providing interfacing between said intermediate level software layer and a second radio unit associated with said second radio link, and said intermediate level software layer providing interfacing between said upper and lower level software layers;

wherein said upper and intermediate level software layers are cooperable to permit a response to a first event associated with said communication on said Bluetooth radio link, wherein said upper, intermediate and lower level software layers are cooperable to permit a response to a second event associated with communication on said second radio link, wherein said intermediate level software layer notifies said upper level software layer of said first and second events, wherein said lower level software layer provides to said intermediate level software layer an event indicator that indicates occurrence of said second event, and wherein said lower level software layer provides said event indicator based on information produced in conjunction with said communication on said second radio link and indicative of an operating condition during said communication on said second radio link, and further based on information contained in said lower level software layer and defining a correspondence between said event indicator and said operating condition.

20. The method of claim 19, wherein said defining information is programmable information.

* * * * *